United States Patent
Chang et al.

(10) Patent No.: US 9,700,034 B1
(45) Date of Patent: Jul. 11, 2017

(54) QUICK BRAKE ADJUST KNOB OF FISHING REEL

(71) Applicant: OKUMA FISHING TACKLE CO., LTD., Taichung (TW)

(72) Inventors: Liang-Jen Chang, Taichung (TW); Ching-Po Liao, Taichung (TW)

(73) Assignee: OKUMA FISHING TACKLE CO., LTD., Taichung (TW)

( * ) Notice: Subject to any disclaimer, the term of this patent is extended or adjusted under 35 U.S.C. 154(b) by 0 days.

(21) Appl. No.: 15/085,258

(22) Filed: Mar. 30, 2016

(30) Foreign Application Priority Data

Feb. 26, 2016 (TW) .............................. 105202766 U

(51) Int. Cl.
*A01K 89/01* (2006.01)
*A01K 89/033* (2006.01)

(52) U.S. Cl.
CPC .................................. *A01K 89/057* (2015.05)

(58) Field of Classification Search
CPC ....... A01K 89/01; A01K 89/018; A01K 89/03
See application file for complete search history.

(56) References Cited

U.S. PATENT DOCUMENTS

| | | | | |
|---|---|---|---|---|
| 2,344,209 A * | 3/1944 | Lowe | .................. | A01K 89/01 242/233 |
| 3,565,362 A * | 2/1971 | Lilland | ............... | A01K 89/01 242/118.4 |
| 3,946,963 A * | 3/1976 | Oberg | .................. | A01K 89/01 242/232 |
| 4,804,150 A * | 2/1989 | Takeuchi | ............... | A01K 89/02 188/166 |
| 5,007,602 A * | 4/1991 | Carlsson | ................ | A01K 89/01 116/67 R |
| 5,820,053 A * | 10/1998 | Takeuchi | ........... | A01K 89/0108 242/231 |
| 6,149,089 A * | 11/2000 | Matsuda | ................ | A01K 89/01 242/246 |
| 6,283,393 B1 * | 9/2001 | Kang | ................. | A01K 89/0111 242/246 |
| 7,344,099 B1 * | 3/2008 | Ivie | .................... | A01K 89/0111 242/246 |
| 2002/0056776 A1 * | 5/2002 | Sugawara | .............. | A01K 89/01 242/231 |
| 2008/0149750 A1 * | 6/2008 | Kitajima | ............... | A01K 89/01 242/224 |

* cited by examiner

*Primary Examiner* — Emmanuel M Marcelo
(74) *Attorney, Agent, or Firm* — Muncy, Geissler, Olds & Lowe, P.C.

(57) ABSTRACT

A quick brake adjust knob, which is disposed on an axle of a fishing reel, includes a base disc, a passive member, an elastic member, a threaded member, an active member, and a panel disc. The passive member has a first arc slope gradually approaching the outside of the knob from a first staring end thereof to a first terminal end thereof and C-shaped with a breach where a first recess is provided. The active member has a first protrusion abutted against the first arc slope or accommodated in the first recess. The panel disc is fixed to the active member and rotatable relative to the base disc. The periphery of the panel disc is joined with the periphery of the base disc. Therefore, the quick brake adjust knob can quickly and precisely control the resistance of the fishing reel to stretch out the fishing wire.

10 Claims, 10 Drawing Sheets

QUICK BRAKE ADJUST KNOB OF FISHING REEL

BACKGROUND OF THE INVENTION

1. Field of the Invention

The present invention relates generally to fishing reels and more particularly, to a quick brake adjust knob of a fishing reel.

2. Description of the Related Art

A fishing rod is usually equipped with a fishing reel for throwing the bait relatively farther and pulling the hooked fish back by means of the fishing reel. When the hooked fish is large and applies large pulling force on the fishing wire, the damping of the rotation of a spool of the fishing reel can be adjusted by means of a brake device of the fishing reel so as to consume the physical strength of the hooked fish and prevent the fishing wire from being pulled apart or separated from the hook by an instant explosive force of the hooked fish.

The brake device of the fishing reel usually includes an adjust knob for controlling the damping of the rotation of the spool. For example, when the adjust knob is screwed off counterclockwise, the damping of the spool is decreased, so the resistance of the fishing wire to the pulling of the hooked fish is relatively smaller. In contrast, when the adjust knob is screwed on clockwise, the damping of the spool is increased, so the resistance of the fishing wire to the pulling of the hooked fish is relatively larger. However, the conventional adjust knob may need to be rotated for 5-6 revolutions for changing the damping of the spool from the minimum level to the maximum level, resulting in time-consumption in rotating the adjust knob. The adjust knob may even need to be adjusted over and over again because the desired damping of the spool may be obtained after several wrong trials, thereby quite inconvenient in usage.

SUMMARY OF THE INVENTION

The present invention has been accomplished in view of the above-noted circumstances. It is an objective of the present invention to provide a quick brake adjust knob of a fishing reel, which can adjust the damping of the spool quickly and precisely.

To attain the above objective, the present invention provides a quick brake adjust knob of a fishing reel, which is adapted for being disposed on an axle of the fishing reel. The axle has a non-circular section and a threaded section extended from the non-circular section to an outside of the fishing reel. The quick brake adjust knob includes a base disc, a passive member, an elastic member, a threaded member, an active member, and a panel disc. The base disc has a first non-circular hole for the non-circular section of the axle to be inserted in the first non-circular hole. The passive member has a second non-circular hole for the non-circular section of the axle to be inserted in the second non-circular hole. An outside of the passive member is provided with an annular plane located at a periphery of the second non-circular hole, and a first arc slope located at a periphery of the annular plane. The first arc slope, which has a first starting end and a first terminal end, gradually approaches an outside of the quick brake adjust knob from the first staring end to the first terminal end, and is C-shaped with a breach where a first recess is provided. The elastic member is adapted for being sleeved onto the non-circular section of the axle. Two ends of the elastic member are abutted against an outside of the base disc and an inside of the passive member respectively. The threaded member is adapted for being screwed onto the threaded section of the axle. An inner end of the threaded member is able to be abutted against the annular plane of the passive member. The active member has an axial hole for the axle to be inserted in the axial hole. An outside of the active member is abutted against the threaded member. An inside of the active member is provided with a first protrusion capable of being abutted against the first arc slope of the passive member or accommodated in the first recess. The panel disc, which is fixed to the active member, has an axial hole accommodating the threaded member, and a protruded rib provided at an outside of the panel disc and having a hollow portion accommodating the threaded member. A periphery of the panel disc is joined with a periphery of the base disc.

As a result, the quick brake adjust knob of the fishing reel can quickly and precisely adjust the resistance of the fishing reel to stretch out the fishing wire or the damping of the spool of the fishing reel.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
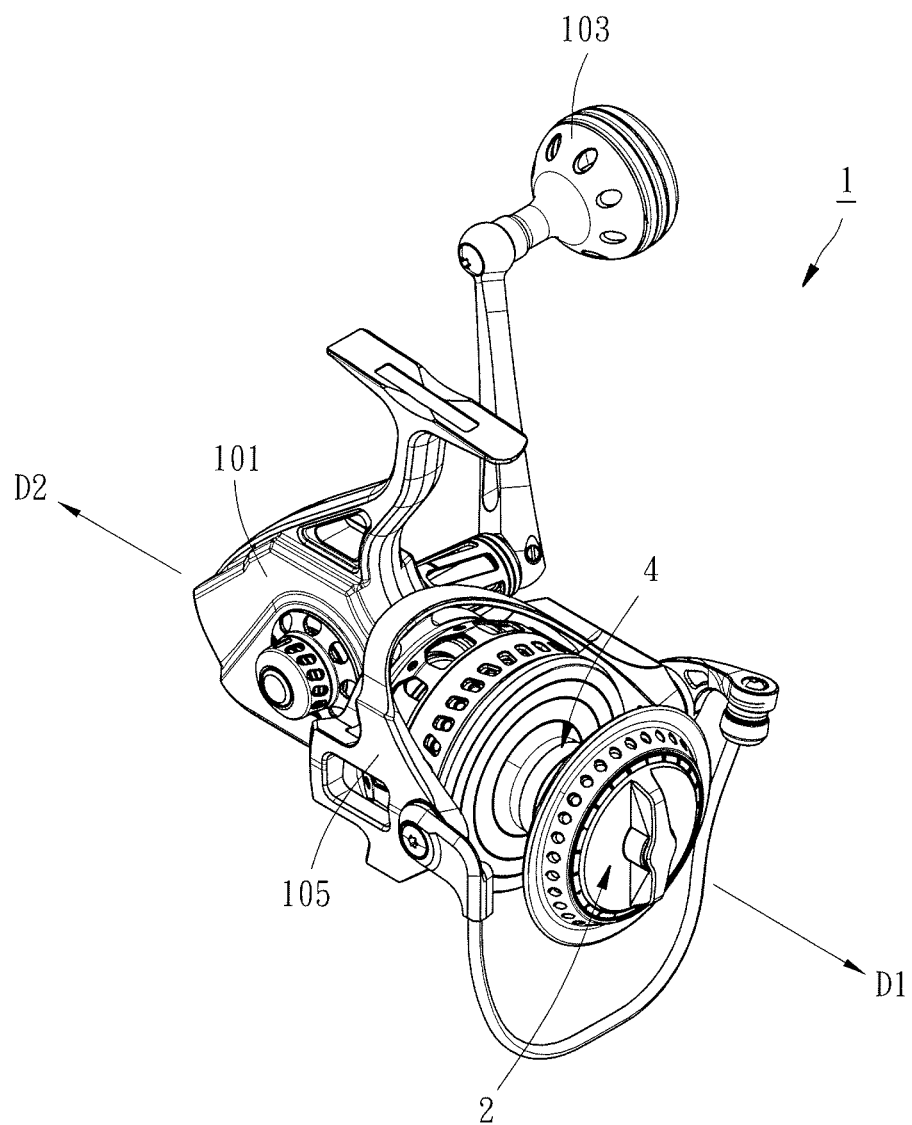
FIG. 1 is a perspective view of a fishing reel according to a preferred embodiment of the present invention.
Figure 2:
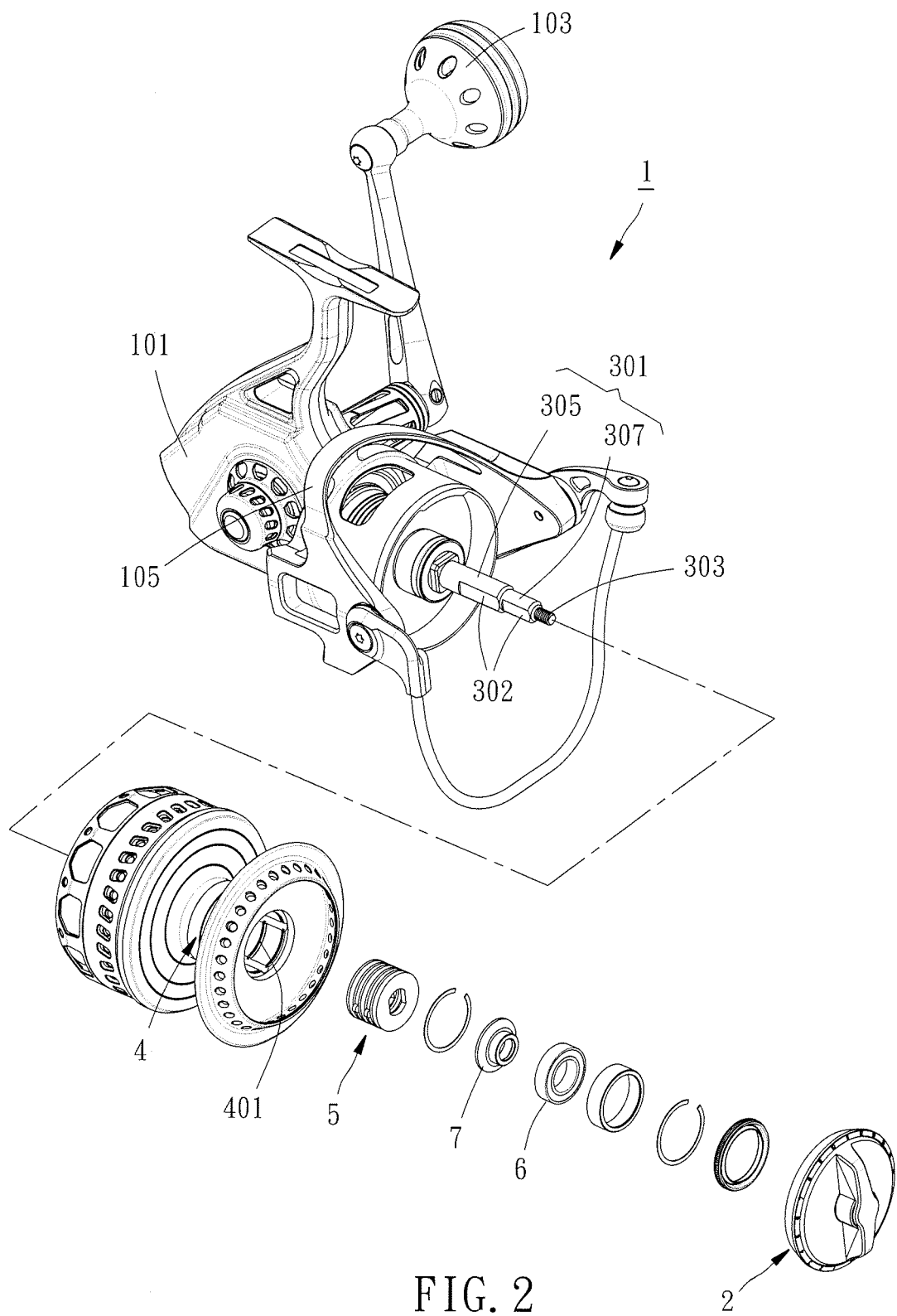
FIG. 2 is an exploded perspective view of the fishing reel according to the preferred embodiment of the present invention.
Figure 3:
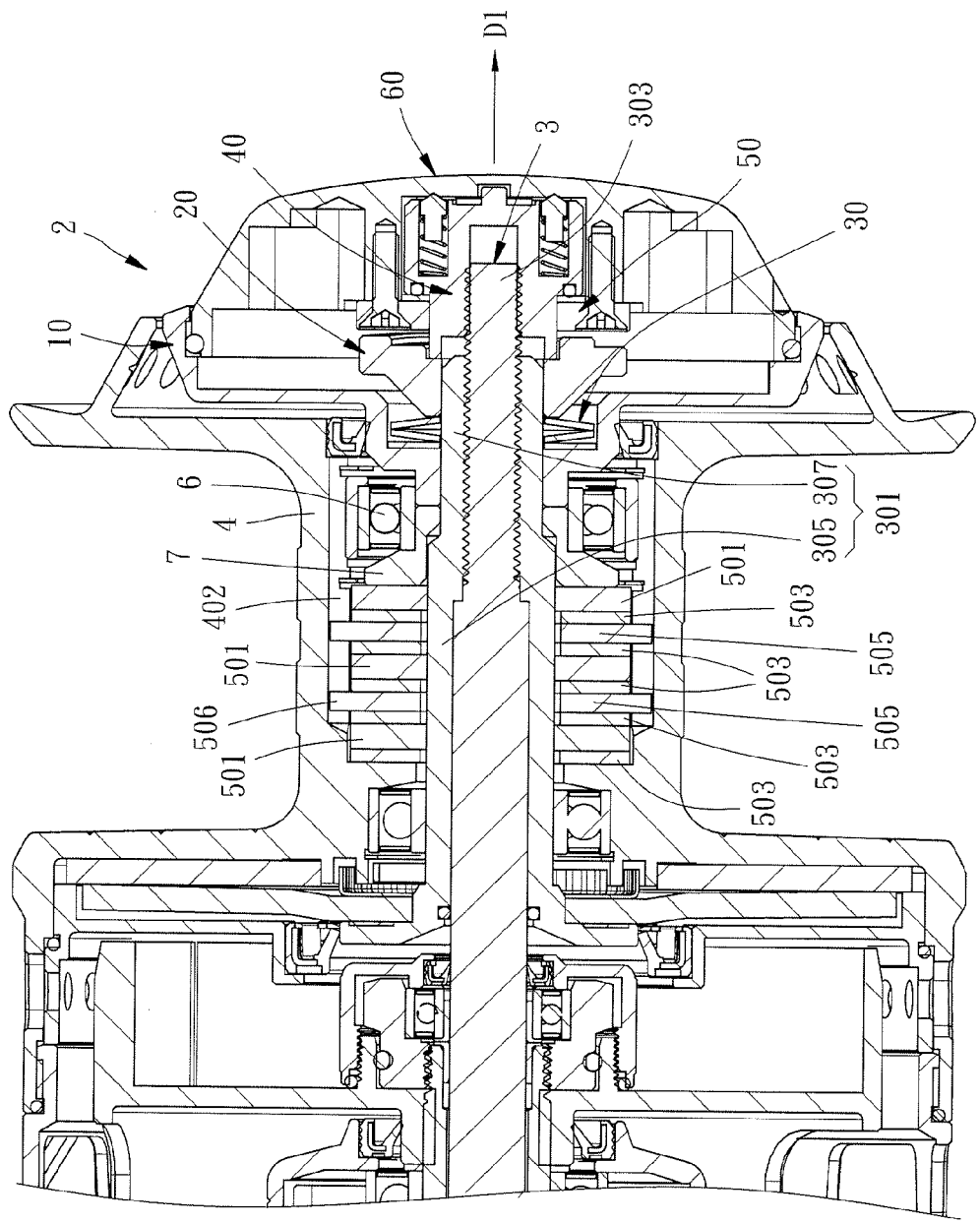
FIG. 3 is a sectional view of a part of the fishing reel according to the preferred embodiment of the present invention.

Refer to FIGS. 1-3, which show a fishing reel 1 having a quick brake adjust knob 2 according to a preferred embodiment of the present invention. It should be noticed that the outside of the fishing reel 1, the quick brake adjust knob 2 or each component of the quick brake adjust knob 2 is defined in the present invention as the side facing toward the direction D1 as shown in FIG. 1, and the inside is defined as the other side facing toward the direction D2. The fishing reel 1 includes a main body 101, a handle arm 103 rotatably disposed on the main body 101, a rotor 105 disposed on the main body 101 and driven by the handle arm 103 to rotate, an axle 3 extended from the main body 101 to the outside of the fishing reel and driven by the handle arm 103 to axially move back and forth, a spool 4 having an axial hole 401, a brake pad set 5 sleeved onto the axle 3, a bearing 6 sleeved onto the axle 3, and a sleeve 7 sleeved onto the axle 3. The axle 3 has a non-circular section 301 and a threaded section 303 extended from the non-circular section 301 to the outside of the fishing reel. The non-circular section 301 is provided at two sides thereof with two pared planes 302, thereby having non-circular cross sections. The axle 3, the brake pad set 5, the bearing 6 and the sleeve 7 are inserted in the axial hole 401 of the spool 4. The spool 4 can be axially moved back and forth along with the axle 3. In this embodiment, the non-circular section 301 of the axle 3 has a large non-circular segment 305 and a small non-circular segment 307, and the threaded section 303 is extended from the small non-circular segment 307 to the outside of the fishing reel. The brake pad set 5 includes three first brake pads 501, each of which has a non-circular hole wherein the large non-circular segment 305 is inserted, five second brake pads 503, each of which has a circular hole, and two third brake pads 505, each of which has a circular hole and two protruded lugs 506 inserted in two elongated grooves 402 in the axial hole 401 of the spool 4 to make the third brake pads 505 capable of rotating relative to the axle 3 but incapable of rotating relative to the spool 4. Because the large non-circular segment 305 is inserted in the non-circular holes of the first brake pads 501, the first brake pads 501 are incapable of rotating relative to the axle 3. Two sides of each third brake pad 505 are separated from the first brake pads 501 by two second brake pads 503 respectively. The leftmost first brake pad 501 in FIG. 3 is separated from the inner wall of the spool 4 by another second brake pad 503. The rightmost first brake pad 501 in FIG. 3 is abutted against the sleeve 7. In this way, when the brake pad set 5 receives a force from the right in FIG. 3, such as a force from the sleeve 7, the friction of the rotation of the spool 4 relative to the axle 3 is increased along with the increasing of the force.

The quick brake adjust knob 2 is disposed on the axle 3 of the fishing reel 1, and includes a base disc 10, a passive member 20, an elastic member 30, a threaded member 40, an active member 50, and a panel disc 60.

Figure 4:
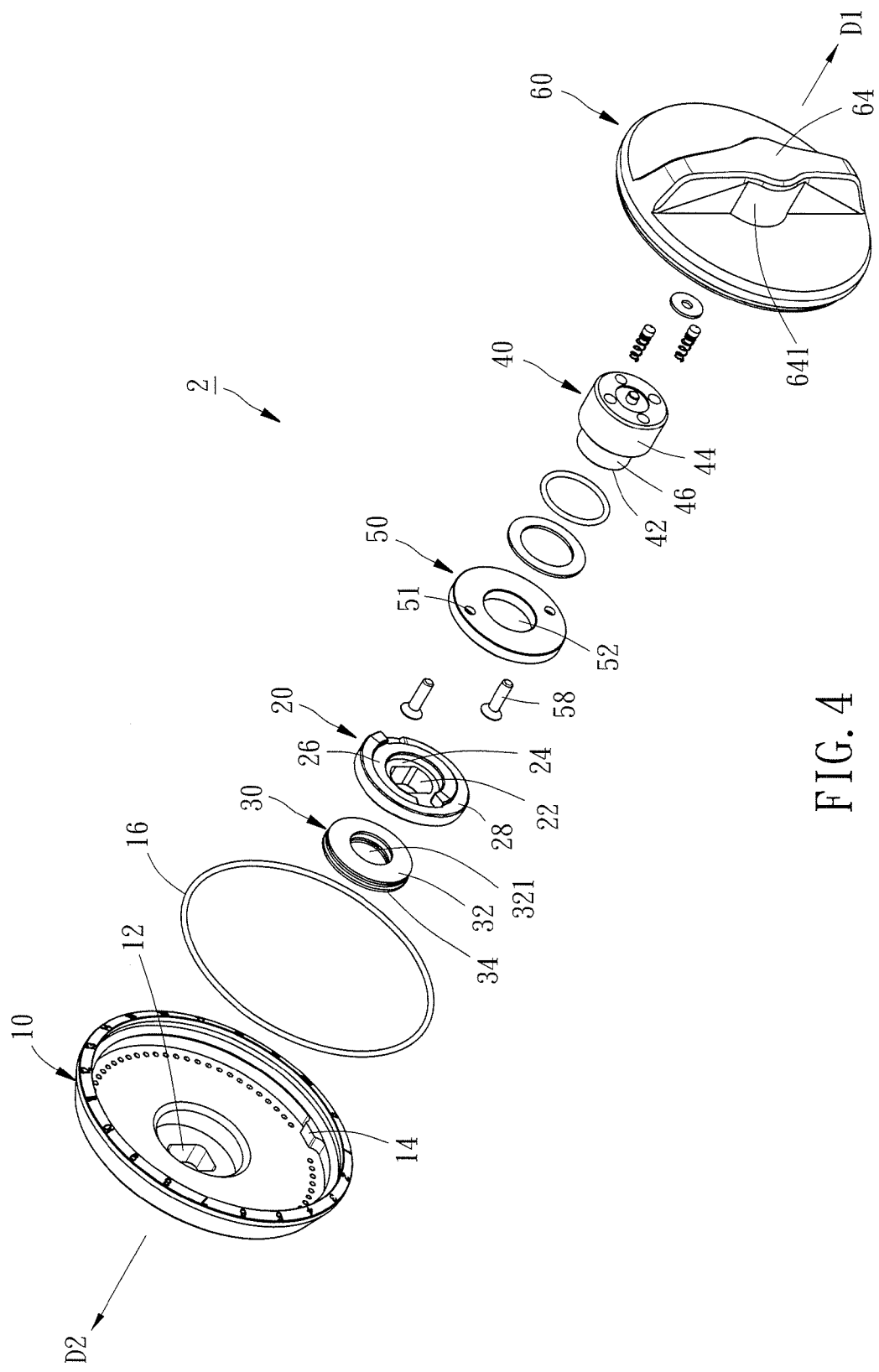
FIG. 4 is an exploded perspective view of a quick brake adjust knob of the fishing reel according to the preferred embodiment of the present invention.
Figure 5:
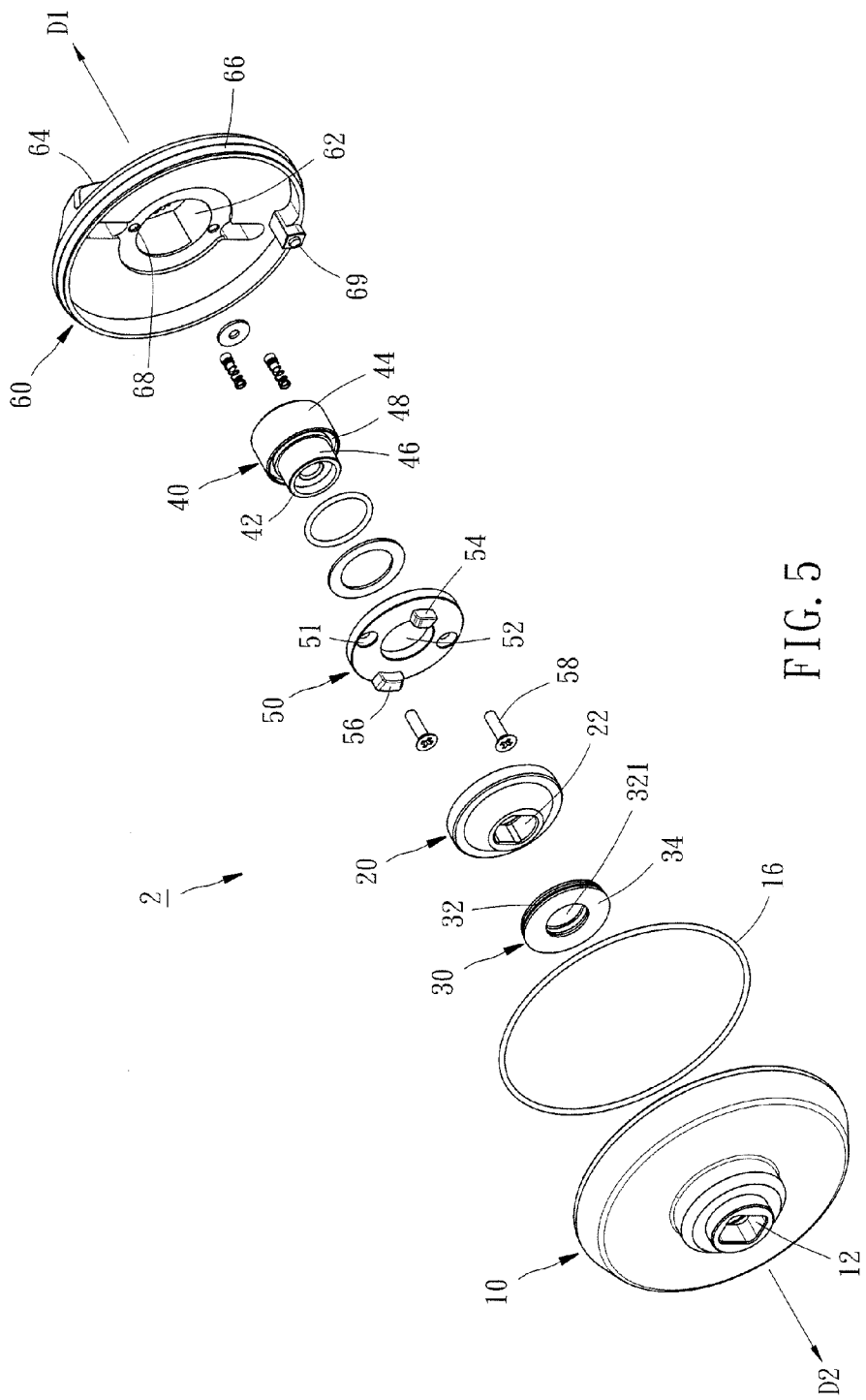
FIG. 5 is another exploded perspective view of the quick brake adjust knob of the fishing reel according to the preferred embodiment of the present invention.

Referring to FIGS. 4-5, the base disc 10 has a first non-circular hole 12 for the small non-circular segment 307 of the axle 3 to be inserted in the first non-circular hole 12, numerical graduations 0-20 provided at the outside of the periphery of the base disc 10, and a limiting block 14 provided at the outside of the base disc 10 and corresponding in position to the numerical graduation 0. The inside of the base disc 10 is abutted against the sleeve 7. The non-circular hole 12 is, but not limited to be, shaped complementarily to the small non-circular segment 307 so as to make the base disc 10 capable of axially moving but incapable of rotating relative to the axle 3.

Figure 6:
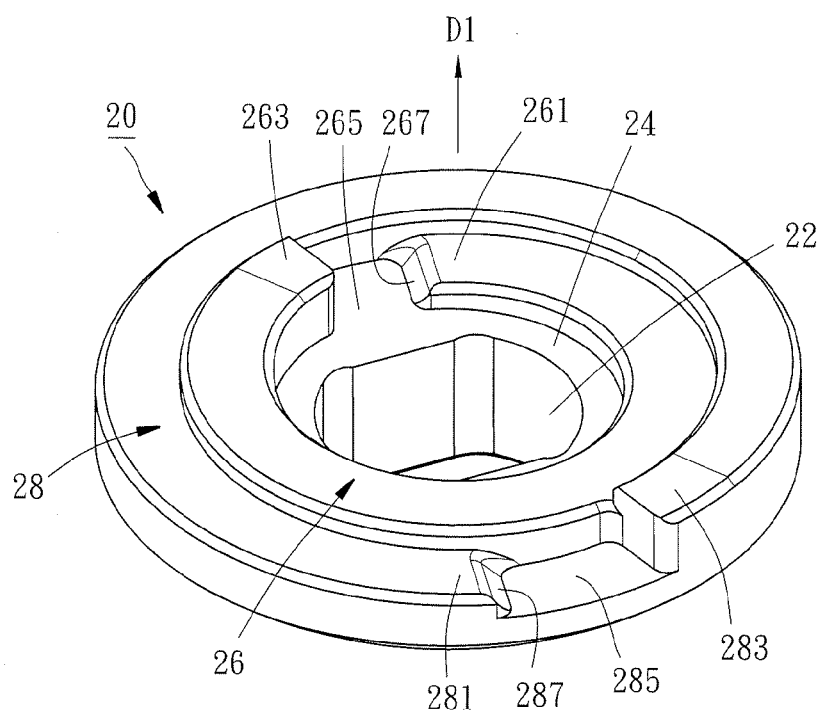
FIG. 6 is a perspective view of a passive member according to the preferred embodiment of the present invention.

Referring to FIG. 6, the passive member 20 has a second non-circular hole 22 for the small non-circular segment 307 of the axle 3 to be inserted in the second non-circular hole 22, so as to make the passive member 20 capable of axially moving but incapable of rotating relative to the axle 3. The outside of the passive member 20 is provided with an annular plane 24 located at the periphery of the second non-circular hole 22, a first arc slope 26 located at the periphery of the annular plane 24, and a second arc slope 28 located at the periphery of the first arc slope 26. The first arc slope 26, which has a first starting end 261 and a first terminal end 263, gradually approaches the outside of the quick brake adjust knob from the first staring end 261 to the first terminal end 263, so that the axial distance between the first terminal end 263 and the annular plane 24 is longer than the axial distance between the first starting end 261 and the annular plane 24. The first arc slope 26 is C-shaped with a breach where a first recess 265 is provided. There is a first guiding slope 267 located between the first recess 265 and the first starting end 261. The second arc slope 28, which has a second starting end 281 and a second terminal end 283, gradually approaches the outside of the quick brake adjust knob from the second staring end 281 to the second terminal end 283, so that the axial distance between the second terminal end 283 and the annular plane 24 is longer than the axial distance between the second starting end 281 and the annular plane 24. Besides, the axial distance between the second terminal end 283 and the annular plane 24 is approximately equal to the axial distance between the first terminal end 263 and the annular plane 24; the axial distance between the second starting end 281 and the annular plane 24 is approximately equal to the axial distance between the first starting end 261 and the annular plane 24. The second arc slope 28 is C-shaped with a breach where a second recess 285 is provided. The second recess 285 and the first recess 265 have an angular orientation difference of about 180 degrees therebetween. There is a second guiding slope 287 located between the second recess 285 and the second starting end 281.

The elastic member 30 is sleeved onto the small non-circular segment 307 of the axle 3. Two ends of the elastic member 30 are abutted against the outside of the base disc 10 and the inside of the passive member 20 respectively. The elastic member 30 includes two spring washers 32, each of which has a circular hole 321 wherein the small non-circular segment 307 is inserted. In this embodiment, there is a normal washer 34 disposed between the elastic member 30 and the base disc 10. In other embodiments, the normal washer 34 may be omitted, and the elastic member 30 may be a spring or other elements having elasticity.

The threaded member 40 is screwed onto the threaded section 303 of the axle 3. An inner end 42 of the threaded member 40 is able to be abutted against the annular plane 24 of the passive member 20. The threaded member 40 has a relatively-larger-radius portion 44, a relatively-smaller-radius portion 46 extended from the relatively-larger-radius portion 44 to the inside of the quick brake adjust knob, and a stair portion 48 located between the relatively-larger-radius portion 44 and the relatively-smaller-radius portion 46. In this way, when being screwed on, the threaded member 40 moves to the left in FIG. 3 to push the passive member 20 to move to the left to compress the elastic member 30. The elastic force of the elastic member 30 is transmitted to the brake pad set 5 through the base disc 10 and the sleeve 7, so as to increase the friction of the rotation of the spool 4 relative to the axle 3. In contrast, when the threaded member 40 is screwed off, the friction of the rotation of the spool 4 relative to the axle 3 is decreased.

Figure 7:
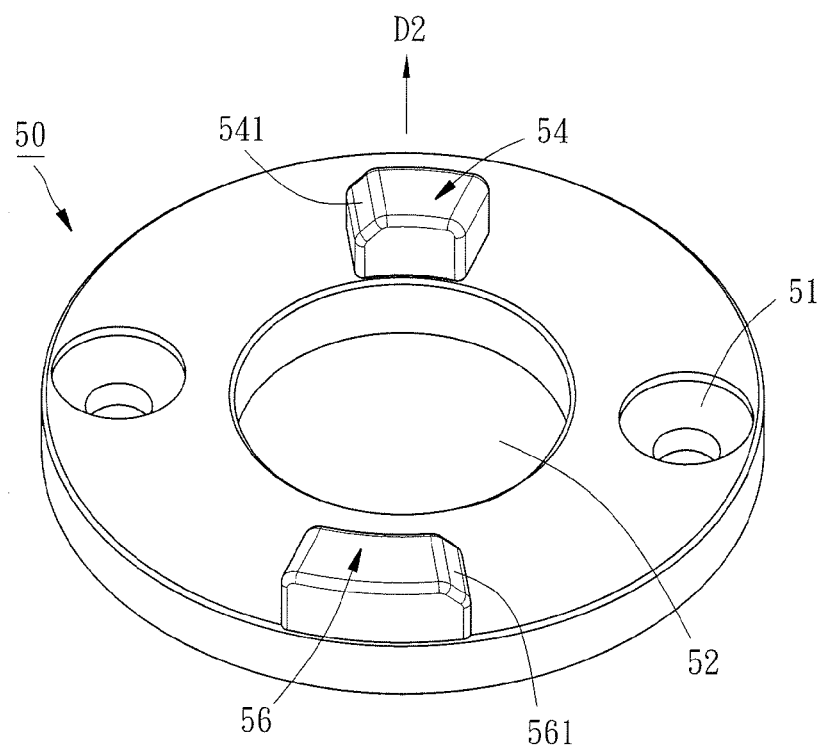
FIG. 7 is a perspective view of an active member according to the preferred embodiment of the present invention.

Referring to FIG. 7, the active member 50 has two through holes 51, and an axial hole 52 located between the two through holes 51 for the axle 3 to be inserted in the axial hole. The axial hole 52 is a circular hole, enabling the active member 50 to rotate relative to the axle 3. The outside of the active member 50 is abutted against the threaded member 40, especially the stair portion 48 of the threaded member 40. The inside of the active member 50 is provided with a first protrusion 54 and a second protrusion 56 located farther away from the axial hole 52 than the first protrusion 54. The first protrusion 54 is capable of being abutted against the first arc slope 26 of the passive member 20 or accommodated in the first recess 265. The second protrusion 56 is capable of being abutted against the second arc slope 28 of the passive member 20 or accommodated in the second recess 285. The first protrusion 54 has a first guiding surface 541 corresponding to the first guiding slope 267 of the passive member 20. The second protrusion 56 has a second guiding surface 561 corresponding to the second guiding slope 287 of the passive member 20.

The panel disc 60 has an axial hole 62 accommodating the threaded member 40, a protruded rib 64 provided at the outside of the panel disc 60, an annular groove 66 provided at the periphery of the panel disc 60, two threaded holes 68 located by two sides of the axial hole 62, and a limiting portion 69 provided at the inside of the panel disc 60. The protruded rib 64 has a hollow portion 641 which accommodates the relatively-larger-radius portion 44 of the threaded member 40. The panel disc 60 is fixed to the active member 50 in a way that two screws 58 are inserted through the two through holes 51 of the active member 50 and screwed into the two threaded holes 68. The periphery of the panel disc 60 is joined with the periphery of the base disc 10 and located in the periphery of the base disc 10. The panel disc 60 is capable of rotating relative to the base disc 10. There is an O-ring 16 disposed between the periphery of the panel disc 60 and the periphery of the base disc 10. The O-ring 16 is elastic, partially accommodated in the annular groove 66 of the panel disc 60, and pressed by the base disc 10, so that the joined parts of the base disc 10 and the panel disc 60 are sealed up and uneasily separated from each other. Referring to FIG. 3, an accommodating space is defined between the base disc 10 and the panel disc 60 and accommodates the passive member 20, the elastic member 30, the active member 50 and a part of the threaded member 40.

Figure 8:
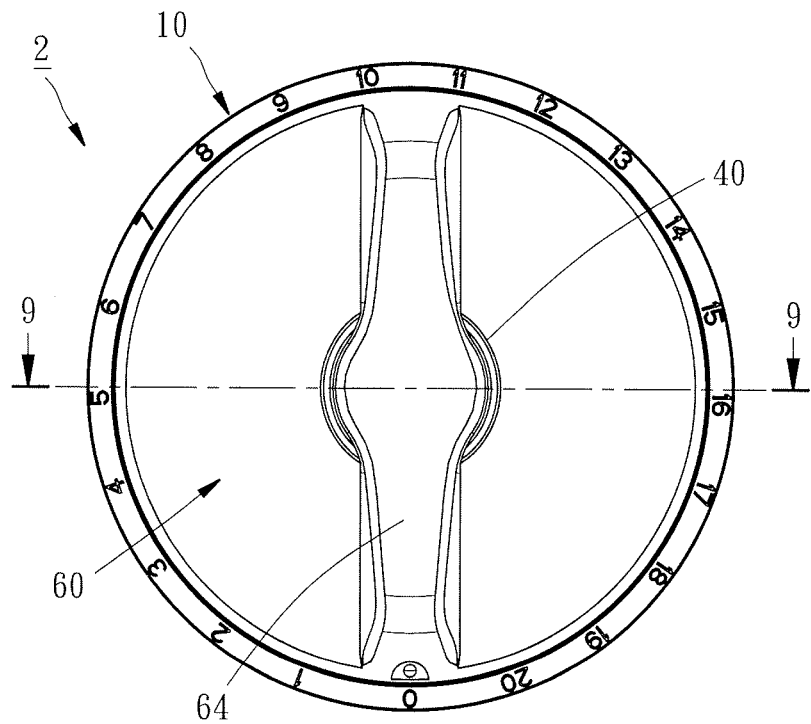
FIG. 8 is a front view of the quick brake adjust knob according to the preferred embodiment of the present invention, showing a panel disc is located at a 0-degree position.
Figure 9:
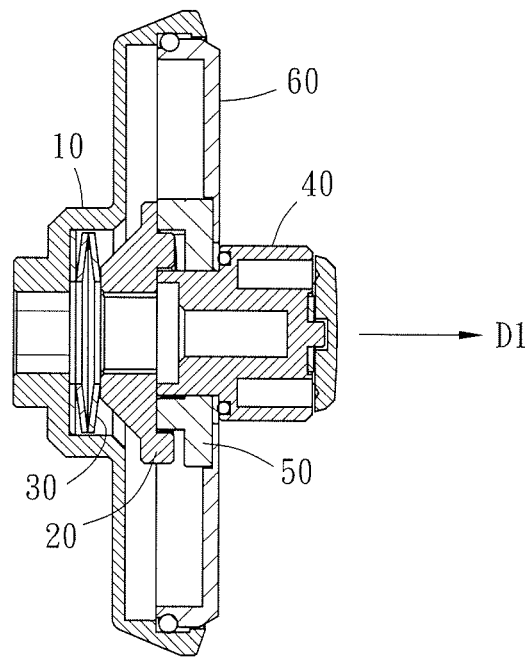
FIG. 9 is a sectional view taken along the line 9-9 in FIG. 8.
Figure 10:
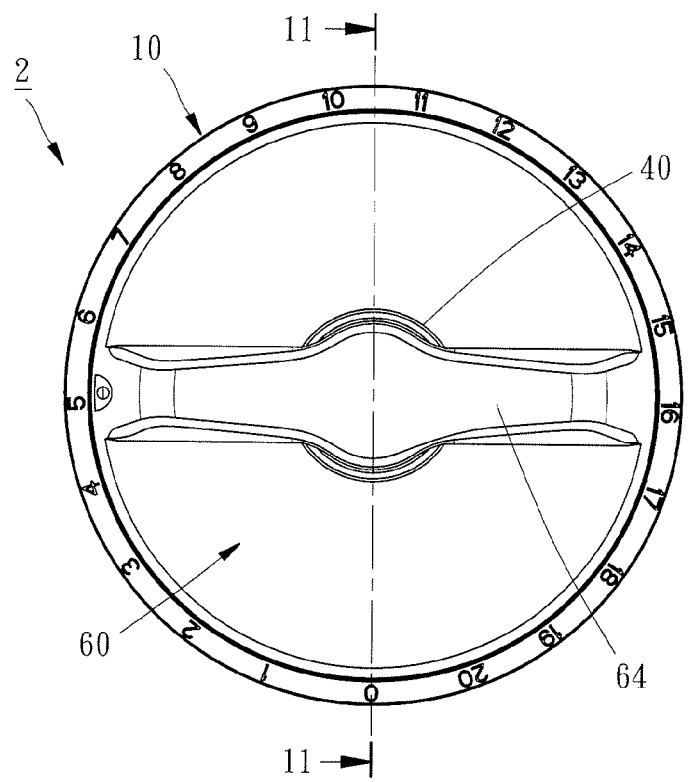
FIG. 10 is a front view of the quick brake adjust knob according to the preferred embodiment of the present invention, showing the panel disc is located at a 90-degree position.
Figure 11:
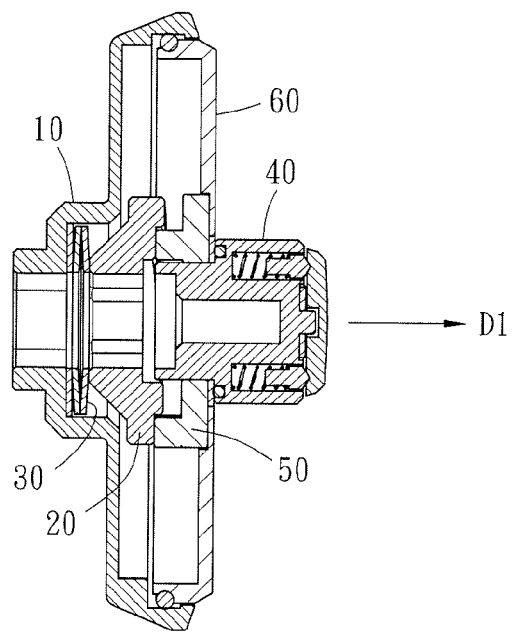
FIG. 11 is a sectional view taken along the line 11-11 in FIG. 10.
Figure 12:
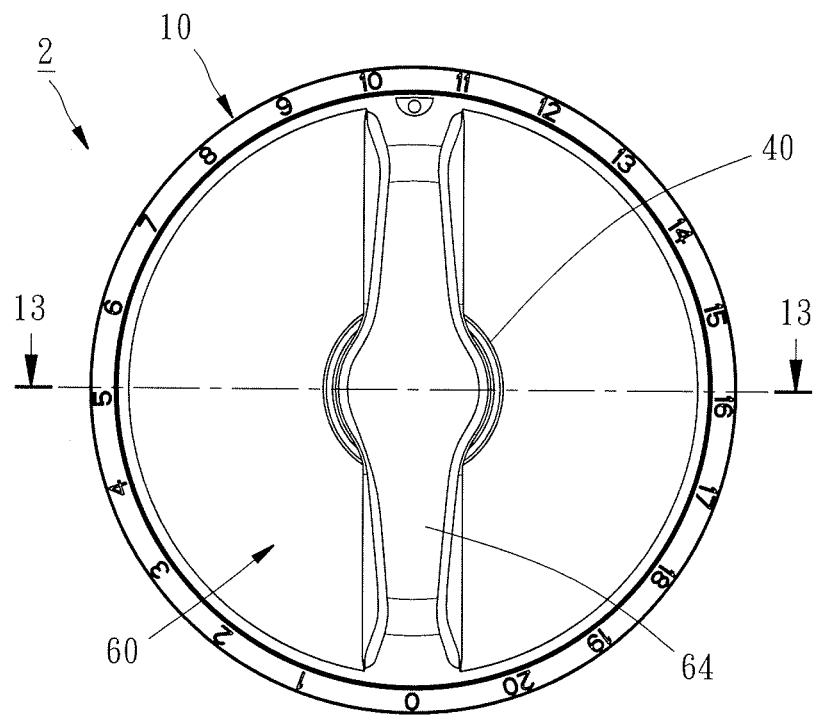
FIG. 12 is a front view of the quick brake adjust knob according to the preferred embodiment of the present invention, showing the panel disc is located at a 180-degree position.
Figure 13:
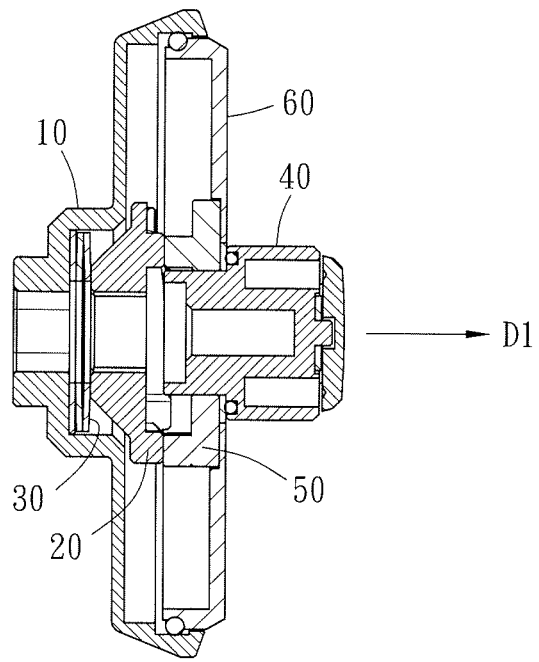
FIG. 13 is a sectional view taken along the line 13-13 in FIG. 12.
Figure 14:
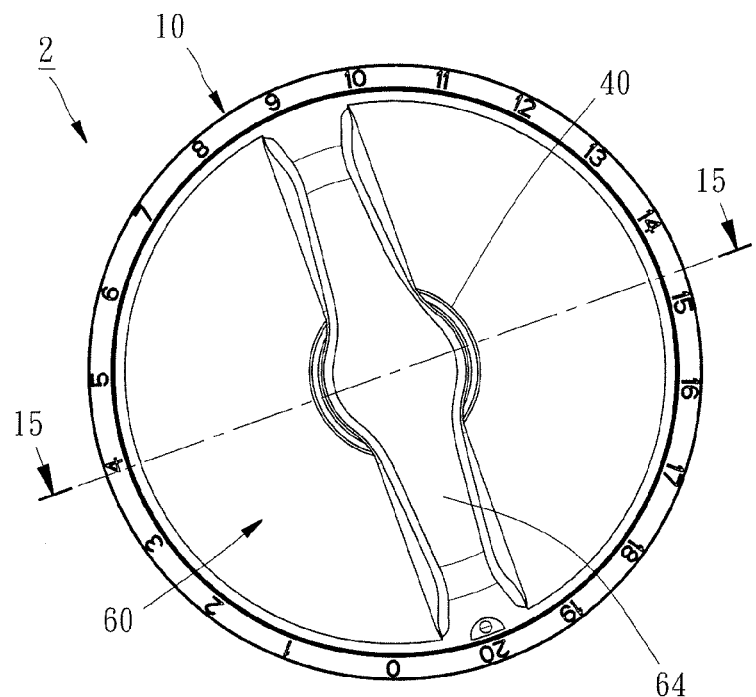
FIG. 14 is a front view of the quick brake adjust knob according to the preferred embodiment of the present invention, showing the panel disc is located at a 340-degree position.
Figure 15:
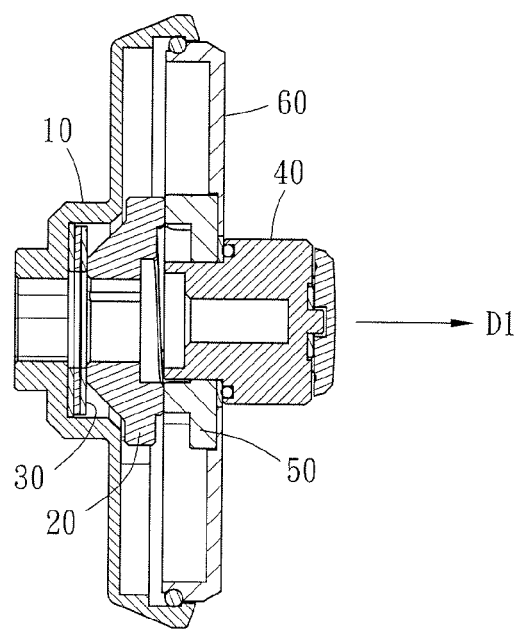
FIG. 15 is a sectional view taken along the line 15-15 in FIG. 14.

Referring to FIGS. 8-15, FIGS. 8-9 show the condition that the panel disc 60 of the quick brake adjust knob 2 is located at a 0-degree position, which means the panel disc 60 is not rotated; FIGS. 10-11 show the condition that the panel disc 60 is located at a 90-degree position; FIGS. 12-13 show the condition that the panel disc 60 is located at a 180-degree position; FIGS. 14-15 show the condition that the panel disc 60 is located at a 340-degree position. When the panel disc 60 of the quick brake adjust knob 2 is located at the initial position as shown in FIGS. 8-9, the first protrusion 54 is accommodated in the first recess 265, the second protrusion 56 is accommodated in the second recess 285, the elastic member 30 and the brake pad set 5 are not pressed, and the damping of the rotation of the spool 4 relative to the axle 3 is small. When the panel disc 60 is rotated clockwise by the user as shown in FIGS. 10-11, the active member 50 fixed to the panel disc 60 is also rotated, the first guiding surface 541 of the first protrusion 54 of the active member 50 is guided by the first guiding slope 267 of the passive member 20 to enable the first protrusion 54 to smoothly escape from the first recess 265 and slide from the first starting end 261 to the first terminal end 263 along the first arc slope 26, and meanwhile the second guiding surface 561 of the second protrusion 56 of the active member 50 is guided by the second guiding slope 287 of the passive member 20 to enable the second protrusion 56 to smoothly escape from the second recess 285 and slide from the second starting end 281 to the second terminal end 283 along the second arc slope 28. While the first protrusion 54 and the second protrusion 56 slides on the first arc slope 26 and the second arc slope 28 respectively, the passive member 20 is pushed by the active member 50 to gradually move to the inside of the quick brake adjust knob axially and compress the elastic member 30. The compressive elastic force of the elastic member 30 is transmitted to the brake pad set 5 through the base disc 10 and the sleeve 7 to increase the damping of the rotation of the spool 4 relative to the axle 3. Besides, the damping of the rotation of the spool 4 is increased along with the increasing of the angle, for which the panel disc 60 is rotated, as shown in FIGS. 12-13. When the panel disc 60 is rotated clockwise to the limit, which means the limiting portion 69 is stopped against the limiting block 14 to disable the panel disc 60 to continue rotating clockwise and at this time the panel disc 60 has been rotated for about 340 degrees as shown in FIGS. 14-15, the first protrusion 54 of the active member 50 is approximately located at the first terminal end 263 of the first arc slope 26, the second protrusion 56 is approximately located at the second terminal end 283 of the second arc slope 28, and the passive member 20 is located at the closest position to the inside of the quick brake adjust knob. At this time, the passive member 20 transmits a maximum force to the sleeve 7 through the elastic member 30 and the base disc 10, so that the damping of the rotation of the spool 4 relative to the axle 3 achieves the maximum level, causing the spool to achieve the brake effect of stopping stretching out the fishing wire.

As a result, when the user rotates the panel disc 60 of the quick brake adjust knob 2 to adjust the damping of the spool 4, the panel disc 60 is rotated for less than 360 degrees to change the damping of the spool 4 from the minimum level to the maximum level. However, the conventional adjust knob of the fishing reel should be rotated for several revolutions to achieve the same effect. In addition, the base disc 10 in the present invention has the numerical graduations, which enables the user to adjust the damping of the spool to the desired value more precisely. Therefore, compared with the conventional adjust knob, the quick brake adjust knob of the present invention can adjust the damping of the spool more quickly and precisely.

It is to be mentioned that before the panel disc 60 is rotated, the threaded member 40 can be rotated to set the initial damping of the spool 4. This is based on that the inner end 42 of the threaded member 40 is abutted against the annular plane 24 of the passive member 20, so the user can rotate the threaded member 40 to move it to the inside of the quick brake adjust knob along the threaded section 303 of the axle 3, so that the threaded member 40 can directly push the annular plane 24 to press the passive member 20 on the elastic member 30. Therefore, a predetermined force can be applied to the brake pad set 5 through the base disc 10 and the sleeve 7 before the panel disc 60 is rotated, so that the spool 4 is applied with an initial damping. In such condition, when the user rotates the panel disc 60, the damping of the spool can be increased more quickly, and the maximum level of the damping may be even increased. The threaded member 40 may serve as a fine-turning unit to enable the user to control the damping of the spool 4 to the desired value more precisely by means of the quick brake adjust knob 2.

Based on the spirit of the present invention, the aforesaid structure may be verified. For example, the structure of the brake pad set 5 of the fishing reel 1 can be changed according to requirements, as long as the brake pad set 5 can perform braking effect on the spool 4 when being pressed. The active member 50 may have only one protrusion, and the passive member 20 may have only one arc slope. The shape of the threaded member 40 may be changed, as long as the threaded member 40 is rotatably disposed on the panel disc 60 and incapable of being separated from the panel disc 60. The base disc 10 and the panel disc 60 may be joined with each other in other ways requiring no such O-ring 16. The base disc 10 and the panel disc 60 may be joined with each other in another way that the periphery of the base disc 10 is located in the periphery of the panel disc 60. The first guiding surface 541, the first guiding slope 267, the second guiding surface 561 and the second guiding slope 287 may be omitted; however, the aforesaid guiding surfaces and slopes can cause the active member 50 to rotate relative to the passive member 20 more smoothly. The sleeve 7 may be omitted, so that the base disc 10 is directly abutted against the brake pad set 5.

The above description represents merely the preferred embodiment of the present invention, without any intention to limit the scope of the present invention. The simple variations and modifications not to be regarded as a departure from the spirit of the invention are intended to be included within the scope of the following claims.

What is claimed is:

1. A quick brake adjust knob of a fishing reel, which is adapted for being disposed on an axle of the fishing reel, the axle having a non-circular section and a threaded section extended from the non-circular section to an outside of the fishing reel, the quick brake adjust knob comprising:
   a base disc having a first non-circular hole for the non-circular section of the axle to be inserted in the first non-circular hole;
   a passive member having a second non-circular hole for the non-circular section of the axle to be inserted in the second non-circular hole, an outside of the passive member being provided with an annular plane located at a periphery of the second non-circular hole, and a first arc slope located at a periphery of the annular plane, having a first starting end and a first terminal end, gradually approaching an outside of the quick brake adjust knob from the first staring end to the first terminal end, and C-shaped with a breach where a first recess is provided;
   an elastic member for being sleeved onto the non-circular section of the axle, two ends of the elastic member being abutted against an outside of the base disc and an inside of the passive member respectively;
   a threaded member for being screwed onto the threaded section of the axle, an inner end of the threaded member being able to be abutted against the annular plane of the passive member;
   an active member having an axial hole for the axle to be inserted in the axial hole, an outside of the active member being abutted against the threaded member, an inside of the active member being provided with a first protrusion capable of being abutted against the first arc slope of the passive member or accommodated in the first recess; and
   a panel disc, which is fixed to the active member, having an axial hole accommodating the threaded member, and a protruded rib provided at an outside of the panel disc and having a hollow portion accommodating the threaded member, a periphery of the panel disc being joined with a periphery of the base disc.

2. The quick brake adjust knob of the fishing reel as claimed in claim 1, wherein the fishing reel has a brake pad set sleeved onto the axle, and a spool having an axial hole wherein the axle and the brake pad set is inserted; an inside of the base disc is adapted for being abutted against the brake pad set.

3. The quick brake adjust knob of the fishing reel as claimed in claim 1, wherein the outside of the passive member is provided with a second arc slope located at a periphery of the first arc slope, having a second starting end and a second terminal end, gradually approaching the outside of the quick brake adjust knob from the second staring end to the second terminal end, and C-shaped with a breach where a second recess is provided; the inside of the active member is provided with a second protrusion capable of being abutted against the second arc slope of the passive member or accommodated in the second recess.

4. The quick brake adjust knob of the fishing reel as claimed in claim 1, wherein the elastic member comprises a plurality of spring washers.

5. The quick brake adjust knob of the fishing reel as claimed in claim 1, wherein the threaded member has a relatively-larger-radius portion, a relatively-smaller-radius portion extended from the relatively-larger-radius portion to an inside of the quick brake adjust knob, and a stair portion located between the relatively-larger-radius portion and the relatively-smaller-radius portion; the outside of the active member is abutted against the stair portion of the threaded member.

6. The quick brake adjust knob of the fishing reel as claimed in claim 1, wherein an O-ring is disposed between the periphery of the base disc and the periphery of the panel disc.

7. The quick brake adjust knob of the fishing reel as claimed in claim 6, wherein the periphery of the panel disc is located in the periphery of the base disc.

8. The quick brake adjust knob of the fishing reel as claimed in claim 1, wherein an accommodating space is defined between the base disc and the panel disc and accommodates the passive member, the elastic member and the active member.

9. The quick brake adjust knob of the fishing reel as claimed in claim 1, wherein the passive member has a first guiding slope located between the first recess and the first starting end of the first arc slope.

10. The quick brake adjust knob of the fishing reel as claimed in claim 9, wherein the first protrusion of the active member has a first guiding surface corresponding to the first guiding slope of the passive member.

* * * * *